United States Patent Office 2,888,781
Patented June 2, 1959

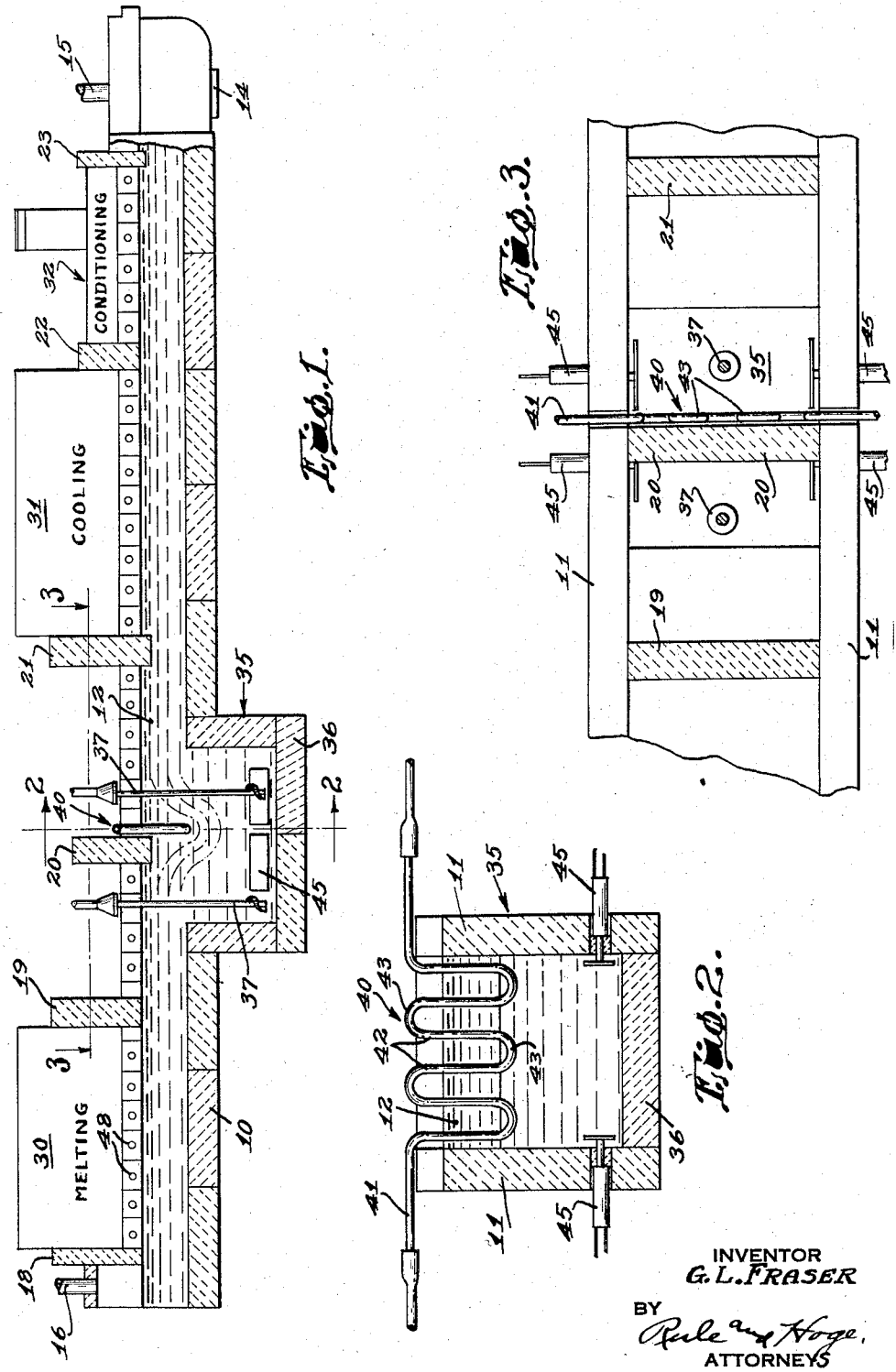

2,888,781

WATER COOLED SKIMMER FOR GLASS FURNACE FOREHEARTH

George L. Fraser, Oakland, Calif., assignor to Owens-Illinois Glass Company, a corporation of Ohio Application August 30, 1955, Serial No. 531,549

1 Claim. (Cl. 49—54)

My invention relates to means for extracting heat from molten glass and controlling the temperature thereof during its flow through a channel. The channel may be in the form of a forehearth of a melting and refining tank. In the manufacture of some lines of glassware, glass batch materials are melted and refined in a so-called continuous tank. The glass flows from the tank at a high temperature into a forehearth or channel and during its flow through the channel the temperature is regulated and controlled, the temperature being materially reduced to the required degree for molding purposes. The capacity of the forehearth, or more specifically the rate of flow and amount of glass that can be transmitted through the forehearth in a given length of time, depends upon the rate at which the glass can be cooled while control of the temperature is maintained.

An object of the present invention is to provide means effecting a comparatively rapid, controlled cooling of the glass during its flow through the forehearth.

A further object of the invention is to provide means for effecting a comparatively rapid cooling of the glass in a localized area of the forehearth without reducing the rate of flow by such cooling of the glass.

The invention provides a novel means for circulating a liquid coolant through the body of flowing glass.

A further object of the invention is to provide, in combination with the means for cooling the glass in the forehearth, means for effectively mixing with the glass, color materials or oxides which control color characteristics of the glass. Such colorants are commonly introduced into the glass adjacent to the point at which the glass flows from the refining tank into the forehearth. These materials are mixed with the glass during the flow through the forehearth, the aim being to produce a homogeneous mass free from color streaks or the like. The present invention permits the color pigments or oxides to be mixed with the glass at a comparatively high temperature which in turn facilitates the complete mixing.

The invention in its preferred form provides means for circulating a cooling liquid through the body of the glass, the liquid being circulated within a metal pipe immersed or partially immersed in the glass. Such a cooling element is located intermediate the ends of the forehearth and extends substantially in a vertical plane perpendicular to the main line of flow through the forehearth.

Referring to the accompanying drawings which illustrate an apparatus for use in practicing the present invention:

Fig. 1 is a longitudinal sectional elevation of the forehearth, parts being broken away;

Fig. 2 is a cross section at the line 2—2 on Fig. 1; and

Fig. 3 is a sectional plan view at the line 3—3 on Fig. 1.

As shown in the drawings, the forehearth comprises a floor 10 which is substantially horizontal and side walls 11. The molten glass 12 enters the forehearth at the left-hand end thereof (Fig. 1) into which it flows from the main melting and refining tank (not shown). The molten glass flows forwardly the full length of the forehearth and is discharged at the outlet 14, under the control of the feeder mechanism including a plunger 15. Color materials may be introduced into the flowing glass through a feeder pipe 16 either in the form of raw materials or a frit or in molten condition. Such materials may include color pigments or various metal oxides which give color to or control color characteristics of the glass. Transverse walls 18, 19, 20, 21, 22, 23 extend across the forehearth at intervals lengthwise thereof, dividing it into compartments. These include a melting compartment 30 between the walls 18, 19, in which colorants or other batch materials introduced through the pipe 16 are melted, a cooling compartment 31 between the walls 21 and 22, and a conditioning compartment 32 extending between the walls 22 and 23.

Intermediate its ends the forehearth is formed with a comparatively deep section 35, which in practice is variously termed a well, tub or sump. The floor 36 of this well is at a lower level than the floor 10. As shown on the drawing the walls 20 and 21 extend below the level of the glass, thereby serving as skimmer blocks. Stirring devices 37 formed with screw-threaded portions extend vertically downward within the well 35 and are rotated continuously for stirring and maintaining the flow of the comparatively cool glass through the lower portion of the well 35.

A heat extracting device 40, sometimes referred to as a skimmer, comprises a water cooled tube 41 which may be an "Inconel" tube or other metal pipe through which a continuous flow of water or other fluid coolant is maintained. This cooling device comprises vertically disposed pipe sections 42 which may be uniformly spaced transversely of the well, said sections united by U-shaped portions 43, thereby providing a zig-zag or tortuous path for the flow of the fluid coolant. The cooling device as shown is only partially immersed in the glass and may be adjusted vertically to extend to any desired depth. The pipe sections 42 are spaced to permit a portion of the glass to flow therebetween while an additional portion flows beneath the pipe, or water cooled dam, as indicated by broken curved lines on Fig. 1. The device 40 thus functions as a skimmer as well as a cooling device.

I have found in practice that this method of cooling the glass permits a relatively rapid flow through the forehearth as the time required for cooling the glass from the comparatively high temperature at which it is delivered to the forehearth to the required temperature at the discharge end of the forehearth, is greatly reduced. Thus, for example, a frit of color material may have a melting temperature of approximately 2500° F., or an optical temperature of the flowing glass within the range of 2400° to 2500° F. may be required at the entrance of the forehearth. This temperature is reduced during the flow through the forehearth to a temperature within the vicinity of 2040° F. required at the discharge outlet. By the use of the cooling means 40 in combination with the well 35 this cooling of the glass can be effected while maintaining a comparatively rapid flow through the forehearth. The cooling and conditioning compartments 31 and 32 permit adequate control and regulation of the temperature required at the discharge end of the forehearth. The depth of the well 35, by increasing the cross sectional area of the channel, permits relatively slow movement of the glass through the cooling area without reducing the volume flow through the forehearth. Heating elements may be provided at any desired position. As shown in Fig. 2, heating electrodes 45 extend through the walls of the well 35 adjacent the floor of the well where the glass would otherwise be comparatively cold and the flow sluggish. These heating elements in cooperation with the stirrers 37 maintain a free circulation and flow of the glass through the well 35 and cooperate to effect a thorough mixture of any colorant materials with the glass. A series of port openings 48 are positioned at short intervals along the side walls of the forehearth throughout substantially its entire length. Burners may be associated with these portions for supplying heat to the flowing glass through any desired heating zones as, for example, the melting zone 30 or cooling air where cooling is desired as in the cooling zone 31. Either heating or cooling may be provided in the conditioning zone 32 as required to bring the glass to the proper temperature at the discharge outlet.

Modifications may be resorted to within the spirit and scope of my invention as defined in the appended claim.

I claim:

In an apparatus for flowing molten glass and including a horizontally disposed, elongated channel through which the glass is caused to flow, the improvements of temperature regulating means disposed medially of the channel and including means defining a well extending transversely to the direction of glass flow and of a depth greater than the depth of the channel both upstream and downstream thereof, heating means disposed in said well adjacent the bottom thereof, a serpentine coolant coil disposed in said well to generally overlie said heating means and defining a skimmer beneath which one portion and through which another portion of the molten glass flowing through said channel is caused to flow, means for introducing a fluid coolant into said coil, and stirring means in said well, said heating means, coolant coil and stirring means promoting the circulation of molten glass in and through said well, and said coolant coil and said heating means cooperating to control the temperature of molten glass in said well without creating a sluggish body of comparatively cold molten glass therein.

References Cited in the file of this patent

UNITED STATES PATENTS

| | | |
|---|---|---|
| 1,615,832 | Gelstharp | Feb. 1, 1927 |
| 1,641,898 | Neenan | Sept. 6, 1927 |
| 1,744,359 | Brown | Jan. 21, 1930 |
| 1,827,480 | Martin | Oct. 13, 1931 |
| 1,937,321 | Howard | Nov. 28, 1933 |
| 1,999,762 | Howard | Apr. 30, 1935 |
| 2,049,600 | Wright | Aug. 4, 1936 |
| 2,115,408 | Brosse | Apr. 26, 1938 |
| 2,593,197 | Rough | Apr. 15, 1952 |
| 2,707,621 | Pieler | May 3, 1955 |